United States Patent [19]

Numazawa et al.

[11] 4,365,523
[45] Dec. 28, 1982

[54] DIE-CAST EXTENSION HOUSING OF AUTOMOTIVE TRANSMISSION

[75] Inventors: Akio Numazawa, Nagoya; Nobuaki Katayama, Toyota; Kazuhito Ikemoto, Toyota; Kan Sasaki, Toyota; Yukio Terakura, Toyota, all of Japan

[73] Assignee: Toyota Jidosha Kogyo Kabushiki Kaisha, Toyota, Japan

[21] Appl. No.: 171,758

[22] Filed: Jul. 24, 1980

[30] Foreign Application Priority Data

Apr. 4, 1980 [JP] Japan .................................. 55-44368

[51] Int. Cl.³ .............................................. F16H 57/02
[52] U.S. Cl. ........................................ 74/606 R; 74/359
[58] Field of Search .................... 74/606 R, 357, 359, 74/360

[56] References Cited

U.S. PATENT DOCUMENTS 1,143,661 6/1915 Sternbergh .......................... 74/606
2,329,354 9/1943 McCarter ........................... 74/359

*Primary Examiner*—Kenneth Dorner

*Attorney, Agent, or Firm*—Cushman, Darby & Cushman

[57] ABSTRACT

A die-cast transmission extension housing has an outer peripheral wall or whell and an integral bearing supporting partition wall provided transversely of the longitudinal axis of the shell between the open forward end and the closed rear end thereof. The partition wall supports at least a bearing for the transmission output shaft extending through the open forward end, the bearing on the partition wall and the closed end. The inner surfaces of the shell forwardly of the rear surface of the partition diverge to the open end of the shell so that the inner space defined by these inner surfaces and the partition can be moulded by a die-casting mould part which is slidable out of the inner space through the open end of the shell after the extension housing is die-cast. The upper wall of the extension housing is formed therein with an upper opening adapted to be closed by a shift lever retainer. The side and bottom walls of the shell cooperate with the partition wall to define a second inner space which is so shaped as to be moulded by another die-casting mould part which is slidable out of the second inner space through the upper opening after the extension housing is die-cast.

1 Claim, 4 Drawing Figures

DIE-CAST EXTENSION HOUSING OF AUTOMOTIVE TRANSMISSION

BACKGROUND OF THE INVENTION

The present invention relates to the construction of an extension housing of an automotive transmission and, more particularly, to a transmission extension housing of the type that is provided with an opened front end at which the extension housing is coupled to the transmission casing, a closed rear end through which the output shaft of the transmission extends, a bearing supporting structure disposed between the opened front end and the closed rear end and supporting a bearing for at least the output shaft, and an upper opening formed in the upper wall of the extension housing for passing therethrough a connecting arm interconnecting a shift lever and a shift fork shaft.

Hitherto, either one of die-casting and ordinary casting method employing cores has been used for the production of the transmission extension housing (referred to simply as "extension housing", hereinafter) of the type described above. More specifically, in the production of the extension housing by die-casting, the bearing supporting structure which is formed by die-casting separately from the die-cast body of the extension housing is fitted into the extension housing body and secured to the latter by means of bolts or the like. According to this method, it is required to provide the extension housing body with integral bosses for bolts, resulting in a correspondingly increased weight of the extension housing. Also, since the bearing supporting structure and the extension housing body are formed as separate components and then united to each other, a troublesome and complicated work is required for obtaining a sufficiently high precision after the components are united together. On the other hand, the ordinary casting method employing cores can provide an extremely low productivity as compared with the die-casting method, although an integral casting of the extension housing body and the bearing supporting structure is possible with the ordinary casting method.

The present inventors have made studies to clarify the reasons why the die-casting which can provide a high productivity has not been used for forming the extension housing body and the bearing supporting structure integrally at a time, and have reached a conclusion that the reason is closely concerned with the relationship between the bearing supporting structure and the upper opening of the housing body provided for a connecting arm interconnecting the shift lever and the shift fork shaft. The upper opening of the extension housing body is provided for passing therethrough the connecting arm and is adapted to be closed by a hollow shift lever retainer which supports the shift lever swingably. The position of the rear edge of the upper opening is limited by various factors such as the position of the shift lever in relation to the position of driver's seat, so that it is not allowed to locate the rear edge of the upper opening too far forwardly of the ordinary position of the shift lever. On the other hand, the bearing supporting structure is formed as a vertical partition wall which extends in a vertical plane normal to the axis of the output shaft which extends through the extension housing in the longitudinal direction thereof, and is intended to support not only the bearing for the output shaft but also the bearing for the counter gear shaft as well. Also, the bearing supporting structure has to slidably support the shift fork shaft. The position of the vertical partition wall formed as the bearing supporting structure, therefore, is determined dependent on the type of transmission.

It has been said that the size of the upper opening should be as small as possible to preserve a sufficiently high mechanical strength and rigidity of the extension housing body. This naturally results in locating the forward edge of the upper opening at a position which is considerably spaced rearwardly from the position of the upper end of the vertical partition wall. This arrangement, therefore, makes it impossible to form or shape the inner space of the extension housing body rearwardly of the vertical partition wall by using a die-casting mold part which is slidable through the upper opening.

SUMMARY OF THE INVENTION

It is, therefore, a primary object of the present invention to provide a transmission extension housing having such a construction as to make it possible to cast the body of the extension housing and the bearing supporting structure at one time and integrally with each other by die-casting method which inherently provides a high productivity, whereby the advantages of the die-casting and integral casting can both be obtained at the same time.

According to the present invention, there is provided a die-cast transmission extension housing comprising a shell having an open end at which the extension housing is connected to a transmission casing, a closed end through which the transmission output shaft extends, a bearing means provided between the open and closed ends for supporting at least a bearing for the transmission output shaft, and an upper wall formed therein with an opening adapted to be closed by a shift lever retainer, wherein the bearing supporting means comprises a partition wall die-cast integrally with the shell, the partition wall and the shell cooperate together to define a first inner space shaped such that the first inner space can be moulded by a die-casting mould part which is slidable out of the inner space through the open end after the die-casting of the extension housing, and the partition wall and the shell further cooperate to define a second inner space shaped such that the second inner space can be moulded by another die-casting mould part which is slidable out of the second inner space obliquely upwardly through the upper opening.

Stated in other words, the inner surfaces of the body or shell of the extension housing which define the first inner space diverge to the open end of the extension housing, while the inner surfaces of the extension housing shell and the partition wall diverge obliquely rearwardly upwardly to the periphery of the upper opening which is adapted to be closed by the shift lever retainer, i.e., at least the upper portion of the surface of the partition wall directed to the closed end of the extension housing may preferably be inclined towards the closed end at an angle relative to a plane normal to the axis of the transmission output shaft and the upper end of the inclined surface may preferably form an edge of the upper opening.

As such, the present invention makes it possible to die-cast a transmission extension housing comprising an outer shell or body and an integral bearing supporting partition wall while avoiding as much as possible the increase in the area of the upper opening and the decrease in the mechanical strength and rigidity of the extension housing.

The above and other objects, features and advantages of the present invention will be made more apparent by the following description with reference to the accompanying drawings.

DESCRIPTION OF PREFERRED EMBODIMENT

Figure 1:
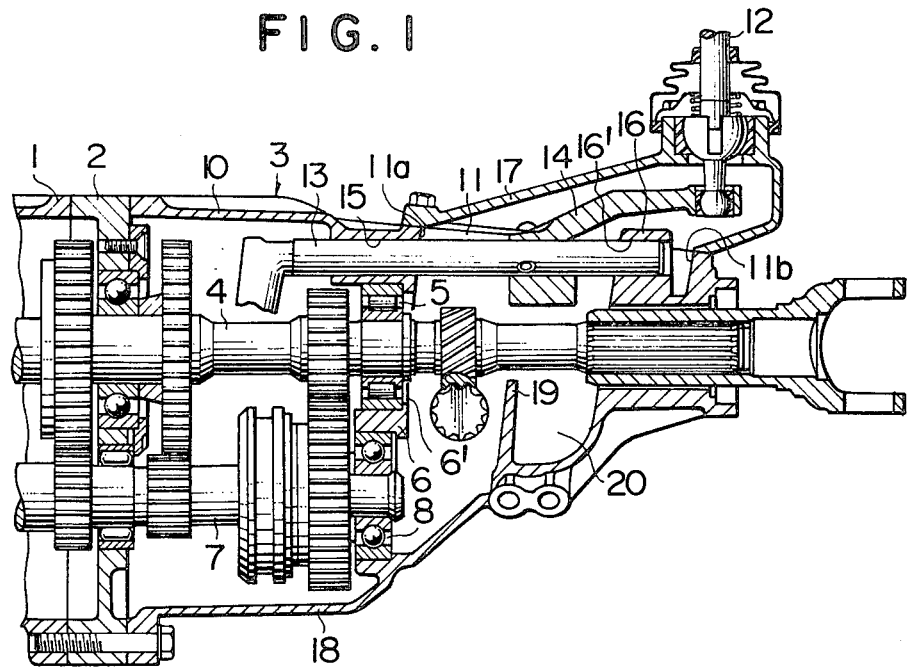
FIG. 1 is a vertical sectional view of a transmission extension housing embodying the present invention.

Referring first to FIG. 1 showing in section a 5-speed transmission, an extension housing generally designated by reference numeral 3 is bolted to the rear end of a conventional transmission casing 1 with an intermediate plate 2 interposed therebetween. The transmission has an output shaft 4 which extends through the extension housing 3 in the longitudinal direction thereof. The output shaft 4 is supported substantially at its lengthwise mid portion by means of a bearing 5. The rear end portion of the output shaft 4 is journaled by the closed rear end of the extension housing 3 in a known manner and projects to the outside of the extension housing 3.

The bearing 5 is supported by a bearing supporting structure constituted by a partition wall 6 which is formed by die-casting integrally with the shell or body of the extension housing including both side walls, bottom wall and upper wall. A counter gear shaft 7 extends from the transmission case 1 into the extension housing 3 and is supported at its rear end portion by a bearing 8 which in turn is carried by the partition wall 6.

An opening 11 is formed in the upper wall 10 of the extension housing 3. This upper opening 11 is adapted to pass therethrough a connecting arm 14 interconnecting the lower end of a shift lever 12 and a shift and select lever shaft 13. The front edge 11a of the upper opening 11 coincides with the upper end of the rear surface 6' of the partition wall 6, while the rear edge 11b of the opening 11 is located near the rear end of the extension housing 3. The shift and select lever shaft 13 is disposed in the extension housing 3 in parallel with and above the output shaft 4. The front end portion of the shift and select lever shaft 13 is supported slidably and rotatably in a bore 15 formed in the partition wall 8, while the rear end of the shaft 13 is supported slidably and rotatably in a bore 16' formed in a projection 16 which extends upwardly from the inside to the outside of the rear portion of the extension housing 3 through the upper opening 11. A hollow shift lever retainer 17 swingably supporting the shift lever 12 is attached by means of bolts to the peripheral portion of the upper opening 11 to close the same. The aforementioned connecting arm 14 is allowed to move back and forth and swing to the left and right within the shift lever retainer 17.

Between the partition wall 6 and the rear end of the extension housing 3, there is provided a wall 19 which protrudes from the bottom wall 18 of the extension housing up to a level just beneath the output shaft 4. This wall 19 and the rear end portion of the housing cooperates with each other to define therebetween an oil reservoir 20.

Figure 2:
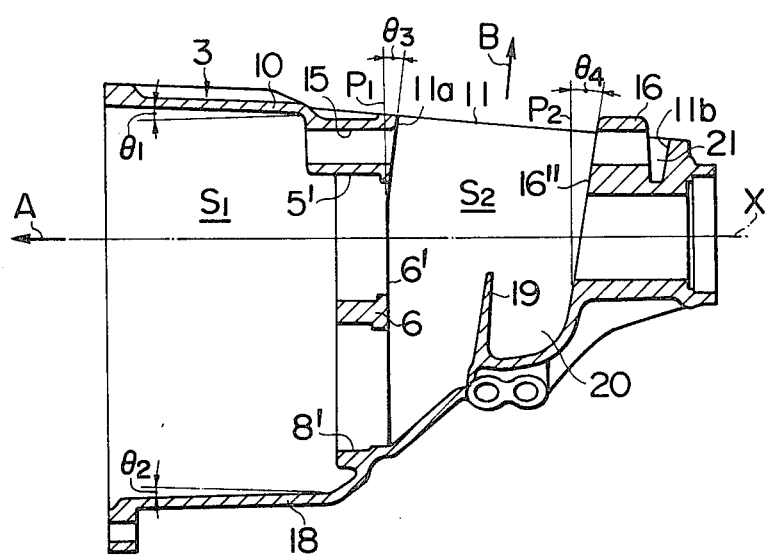
FIG. 2 is a view similar to FIG. 1 but shows the inner configuration of the extension housing with gears and shafts being removed for the simplification of the drawing.

The inner configuration of the extension housing 3 will be described hereinunder with specific reference to FIG. 2.

The front end, i.e., the portion to be connected to the intermediate plate 2 shown in FIG. 1, of the extension housing 3 is opened. The upper wall 10 and the bottom wall 18 diverge from the partition wall 6 forwardly to the opened front end at angles $\theta_1$ and $\theta_2$, respectively, relative to the axis X of the output shaft 4. In the illustrated embodiment, the angles $\theta_1$ and $\theta_2$ are both 1.5°. The bores formed in the partition wall 6, i.e., the bore 15 for receiving and supporting the shift and select lever shaft 13 and the bores 5' and 8' for receiving and supporting the bearings 5 and 8, diverge from the rear to the front ends thereof before they are machined. Also, the portions of the side walls of the extension housing extending forwardly from the partition wall 6 have inner surfaces (not shown) which also diverge toward the opened front end of the extension housing 3. It will be understood that the internal space $S_1$ of the portion of the extension housing 3 between the rear surface 6' of the partition wall 6 and the opened front end has a shape which can be formed or shaped by a die-cast mold part slidable forwardly through the opened front end, i.e., in the direction of an arrow A, after the die-casting.

The upper part of the rear surface 6' of the partition wall 6, i.e., the portion of the wall 6 above the point at which the partition wall crosses the axis X of the output shaft 4, is inclined rearwardly at an angle $\theta_3$ relative to a plane $P_1$ which is normal to the axis X of the output shaft 4. The front surface 16" of the projection 16 formed at the rear portion of the extension housing 3 is a flat surface which is rewardly inclined, to a plane $P_2$ parallel to the plane $P_1$, at an angle $\theta_4$ which is greater than the angle $\theta_3$. The lower end of the inclines flat surface 16" constitutes the rear wall of the oil reservoir 20. The front wall 19 of the oil reservoir 20 is also inclined rearwardly at an angle which is intermediate between the aforementioned angles $\theta_3$ and $\theta_4$. Also, the rear surface of a gap 21 left between the rear surface of the projection 16 and the rear end of the extension housing 3 is inclined rearwardly. The upper end of this inclined surface coincides with the rear edge 11b of the upper opening 11. The inner surfaces (not shown) of portions of the side walls of the extension housing 3 extending rearwardly from the partition wall 6 diverge to the side edges of the upper opening 11. It will be understood that the space $S_2$ between the rear surface 6' of the partition wall 6 and the rear end of the extension housing has a configuration which can be formed or shaped by a die-cast mould part which is slidable through the upper opening 11 in a direction of an arrow B which is inclined to the plane $P_1$ at an angle intermediate between the aforementioned angles $\theta_3$ and $\theta_4$.

As will be seen from the foregoing description, the construction of the transmission extension housing of the invention permits the bearing supporting structure to be die-cast integrally with the shell or body of the extension housing.

Thus, the present invention greatly contributes to the improvement in the productivity and reduction in the production cost.

Figure 3:
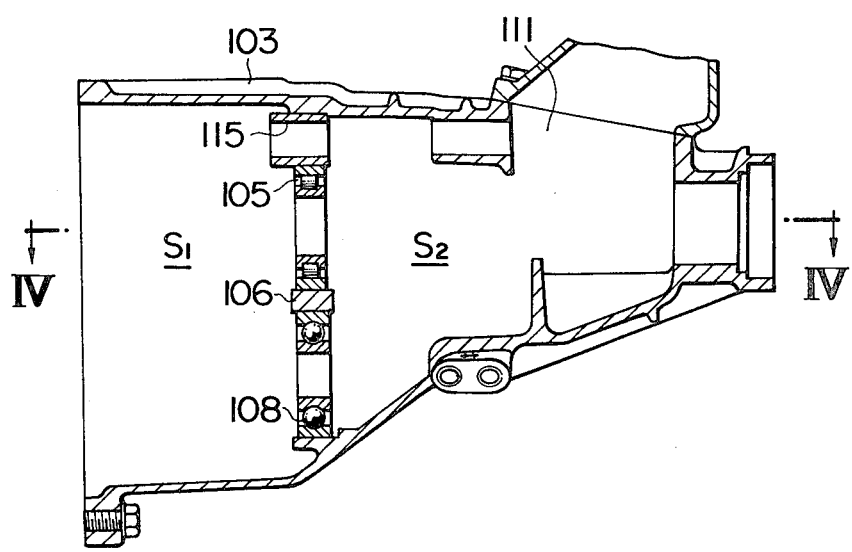
FIG. 3 is a vertical sectional view of a conventional die-cast extension housing taken along line III—III in FIG. 4.
Figure 4:
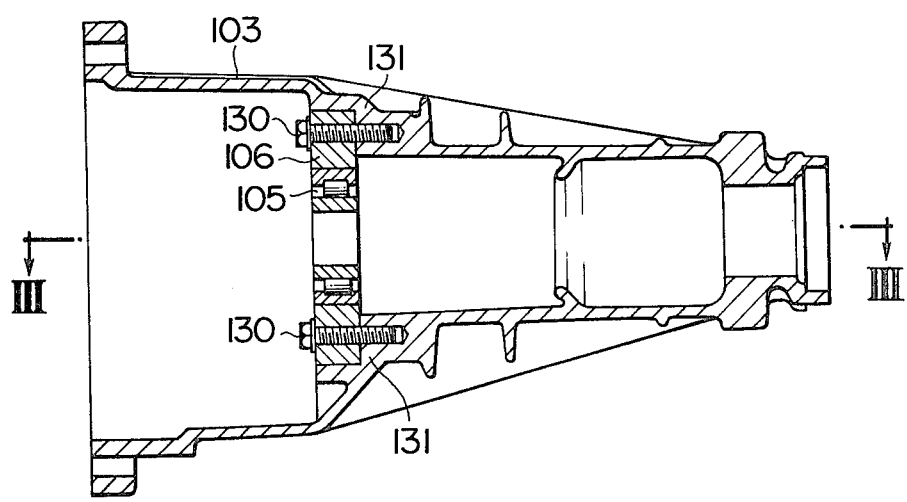
FIG. 4 is a horizontal sectional view taken along line IV—IV in FIG. 3.

By way of reference, a conventional die-cast transmission extension housing 103 will be described with reference to FIGS. 3 and 4 which illustrate the conventional extension housing in vertical and horizontal sections, respectively.

As will be seen in these drawings, the conventional extension housing 103 has a bearing support member 106, which is adapted to support a bearing 105 for the transmission output shaft and a bearing 108 for the counter gear shaft and to slidably and rotatably support the shift fork shaft, is prepared or cast separately of the body or shell of the housing 103. The two members are, thereafter, secured to each other by means of a plurality of bolts 130, as best shown in FIG. 4. It is therefore necessary to form a plurality of bosses 131 on the housing 103 for mounting the bolts. As a result, the weight of the housing 103 is increased and, since the bearing supporting member and the shell of the housing 103 are prepared separately and then united together, a complicated and troublesome works are required to obtain a sufficiently high precision of the united structure as well as for tightening the bolts.

In contrast to the above, the construction of the transmission extension housing provided by the present invention makes it possible to die-cast the shell or body portion of the housing and the bearing supporting partition wall integrally with each other without reducing the mechanical strength and rigidity of the housing. Thus, the present invention advantageously assure improvements in the productivity of the transmission extension housing and in the cost of manufacture thereof.

What is claimed is:

1. A die-cast transmission extension housing comprising a shell having a first end at which said extension housing is adapted to be connected to a transmission casing, said first end defining therein a first opening, a second end defining therein a second opening for a transmission output shaft, a bearing supporting means provided between said first and second ends for supporting at least one bearing for said transmission output shaft, said bearing supporting means comprising a partition wall die-cast integrally with said shell, said shell comprising a first part extending between said first end and said partition wall and a second part extending between said partition wall and said second end, said first part of said shell and said partition wall cooperating to define a first inner space divergent to a peripheral edge of said first opening, said second part of said shell having a top formed therein with a third opening adapted to be closed by a shift lever retainer, said second part of said shell, said partition wall and said second end cooperating to define a second inner space communicating with said second and third openings, said partition wall having a first surface facing said second inner space and extending between said top of said second part of said shell and a bottom of said second part, said first surface comprising upper and lower sections, said upper section being inclined toward said second end of said shell at a first angle relative to a plane normal to the axis of said transmission output shaft with said lower section being substantially normal to said axis, said second end of said shell having a second surface facing said second inner space and extending generally downwardly from said top of said second part of said shell, said second surface being inclined away from said partition wall relative to said plane normal to said axis at a second angle greater than said first angle so that said upper section of said first surface and said second surface are divergent to said third opening.

* * * * *